United States Patent
Yamamoto (10) Patent No.: US 7,667,175 B2
(45) Date of Patent: Feb. 23, 2010

(54) IMAGING DEVICE DRIVER AND AUTO FOCUS UNIT

(75) Inventor: Yasuhiro Yamamoto, Tokyo (JP)

(73) Assignee: HOYA Corporation, Tokyo (JP)

( * ) Notice: Subject to any disclaimer, the term of this patent is extended or adjusted under 35 U.S.C. 154(b) by 0 days.

(21) Appl. No.: 11/685,386

(22) Filed: Mar. 13, 2007

(65) Prior Publication Data

US 2007/0215791 A1    Sep. 20, 2007

(30) Foreign Application Priority Data

Mar. 14, 2006    (JP)    ............................. 2006-069016

(51) Int. Cl.
- H01L 27/00    (2006.01)
- G02B 7/04    (2006.01)
- H04N 5/235    (2006.01)
- H04N 3/14    (2006.01)

(52) U.S. Cl. .............. 250/208.1; 250/201.2; 348/230.1; 348/296; 348/311

(58) Field of Classification Search ................ 250/200, 250/201.1–201.4, 201.7, 208.1, 216, 221, 250/222.1, 214 AL, 214 LA, 214 A; 348/294, 348/296, 300, 308, 362–364, 221.1, 230.1, 348/297–298, 311, 317, 320, 322; 257/225, 257/292; 358/474–475, 482, 520

See application file for complete search history.

(56) References Cited

U.S. PATENT DOCUMENTS 5,406,391 A  *  4/1995  Takahashi .................. 358/482

| 6,670,993 | B1 * | 12/2003 | Yamamoto et al. | .......... 348/362 |
|---|---|---|---|---|
| 7,317,488 | B2 * | 1/2008 | Yamazaki | .................... 348/353 |
| 7,430,011 | B2 * | 9/2008 | Xu et al. | ..................... 348/362 |
| 2006/0001747 | A1 | 1/2006 | Yamamoto | |
| 2006/0001929 | A1 | 1/2006 | Yamamoto | |

FOREIGN PATENT DOCUMENTS

JP    2005-107252    4/2005

OTHER PUBLICATIONS

English language Abstract of JP 2005-107252.
U.S. Appl. No. 11/676,543 to Yamamoto et al., filed Feb. 20, 2007.
U.S. Appl. No. 11/676,520 to Yamamoto et al., filed Feb. 20, 2007.

* cited by examiner

*Primary Examiner*—Georgia Y Epps
*Assistant Examiner*—Don Williams
(74) *Attorney, Agent, or Firm*—Greenblum & Bernstein P.L.C.

(57) ABSTRACT

An imaging device driver that drives an imaging device, comprising a detector and a controller, is provided. The imaging device has a light-receiving surface. A plurality of pixels are arranged on the light-receiving surface. Each individual pixel generates a pixel signal according to the intensity of light received by the pixel. The imaging device is capable of mixing a plurality of the pixel signals. The detector detects the brightness of a partial or entire optical image of an object captured by the imaging device. The controller determines the number of the pixel signals to mix according to the brightness of the partial or entire optical image.

11 Claims, 6 Drawing Sheets

IMAGING DEVICE DRIVER AND AUTO FOCUS UNIT

BACKGROUND OF THE INVENTION

1. Field of the Invention

The present invention relates to an imaging device driver that controls the number of pixels to be mixed together by an imaging device which can carry out pixel mixing process and an auto focus unit that brings an object into focus based on an imaging signal generated by the imaging device controlling the number of pixels to be mixed.

2. Description of the Related Art

Many pixels are arranged on a light-receiving surface of an imaging device. Each pixel generates a pixel signal according to a received amount of light. By receiving an optical image of an object on an entire light-receiving surface, an image signal comprised of pixel signals created by some, if not all, of the pixels is generated.

A charge transfer type of imaging device, such as a CCD area sensor, has a plurality of pixels on its light-receiving surface. Each pixel generates a signal charge according to the received amount of light. In general, each individual signal charge is transferred and converted into a pixel signal that is a potential signal. During the transfer of the signal charge, the pixel mixing process is carried out by mixing signal charges generated by a plurality of pixels. By executing pixel mixing process for a plurality of pixels which are adjacent to each other and of the same color is, the sensitivity is raised and an optical image of a dark object can be captured with a higher sensitivity.

In general, some functions that are carried out by a digital camera based on a captured image do not work well with dark objects. However, by using pixel mixing process, such functions can be made to work accurately with dark objects.

On the other hand, when an optical image of a bright object is captured by a pixel mix processing system, or when an entire optical image which includes an optical image of a bright light source is captured by a pixel mix processing system, mixed signal charges became saturated because of the transfer capacity of the vertical and horizontal CCD. Accordingly, in such a case the accuracy of some functions, such as the auto focus function, deteriorates.

SUMMARY OF THE INVENTION

Therefore, an object of the present invention is to provide an imaging device driver and an auto focus unit that drives an imaging device so as to maintain an adequate signal level of a pixel signal.

According to the present invention, an imaging device driver that drives an imaging device, comprising a detector and a controller, is provided. The imaging device has a light-receiving surface. A plurality of pixels are arranged on the light-receiving surface. The pixel generates a pixel signal according to the intensity of light received on the pixel. The imaging device is capable to mix a plurality of the pixel signals. The detector detects the brightness of a partial or entire optical image of an object captured by the imaging device. The controller determines the number of the pixel signals to mix according to the brightness of the partial or entire optical image.

Further, the controller increases the number of the pixel signals to mix as the brightness of the partial or entire optical image is dark.

Further, the imaging device driver comprises a amplifier. The amplifier amplifies the image signal by a amplification ratio according to the number of pixel signals to mix.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
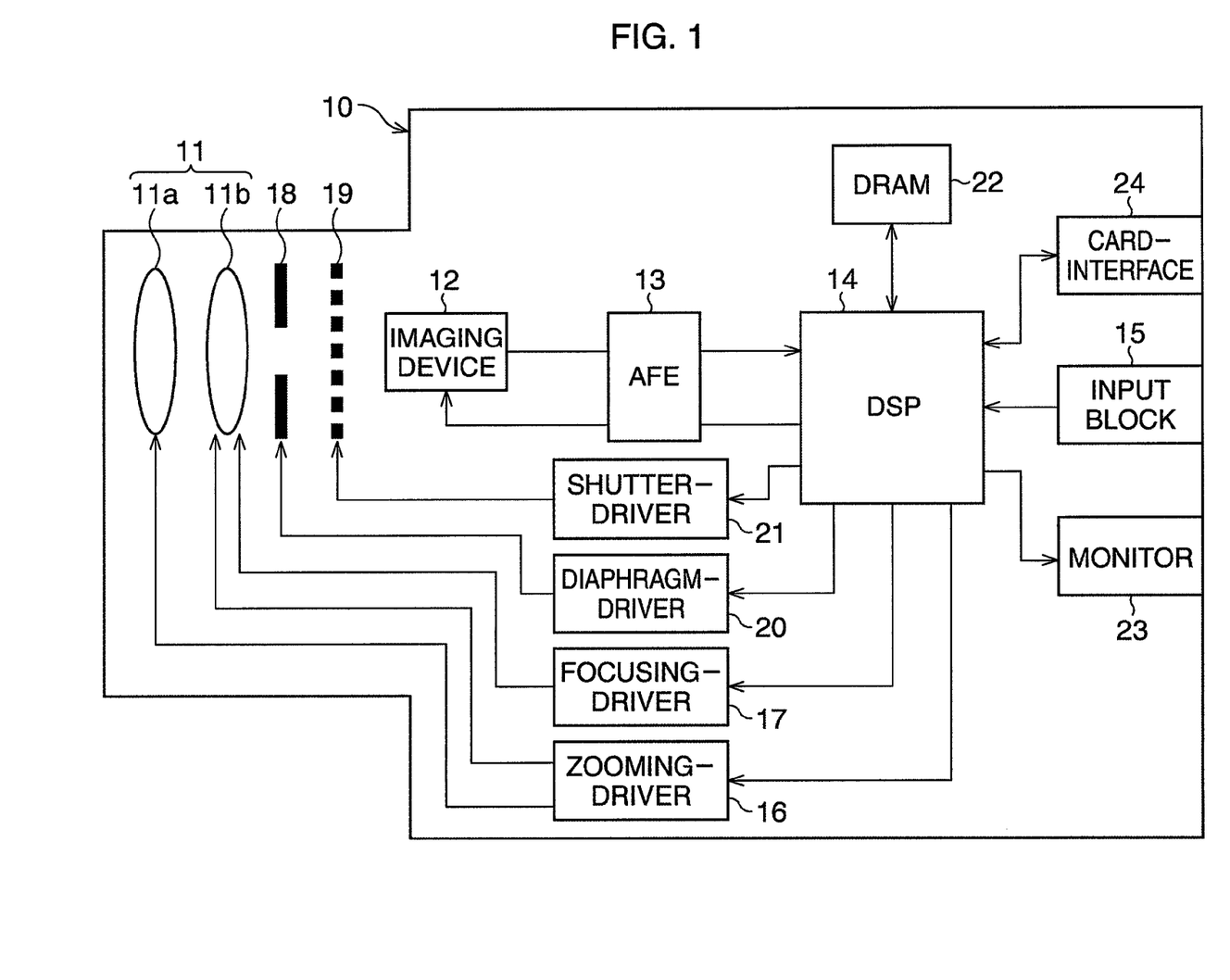
FIG. 1 is a block diagram showing the internal structure of a digital camera having an imaging device driver and an auto focus unit of an embodiment of the present invention.

In FIG. 1, a digital camera 10 comprises a photographic optical system 11, an imaging device 12, an analog front end (AFE) 13, a DSP 14, an input block 15, a zooming-driver 16, a focusing-driver 17, and other components.

Figure 2:
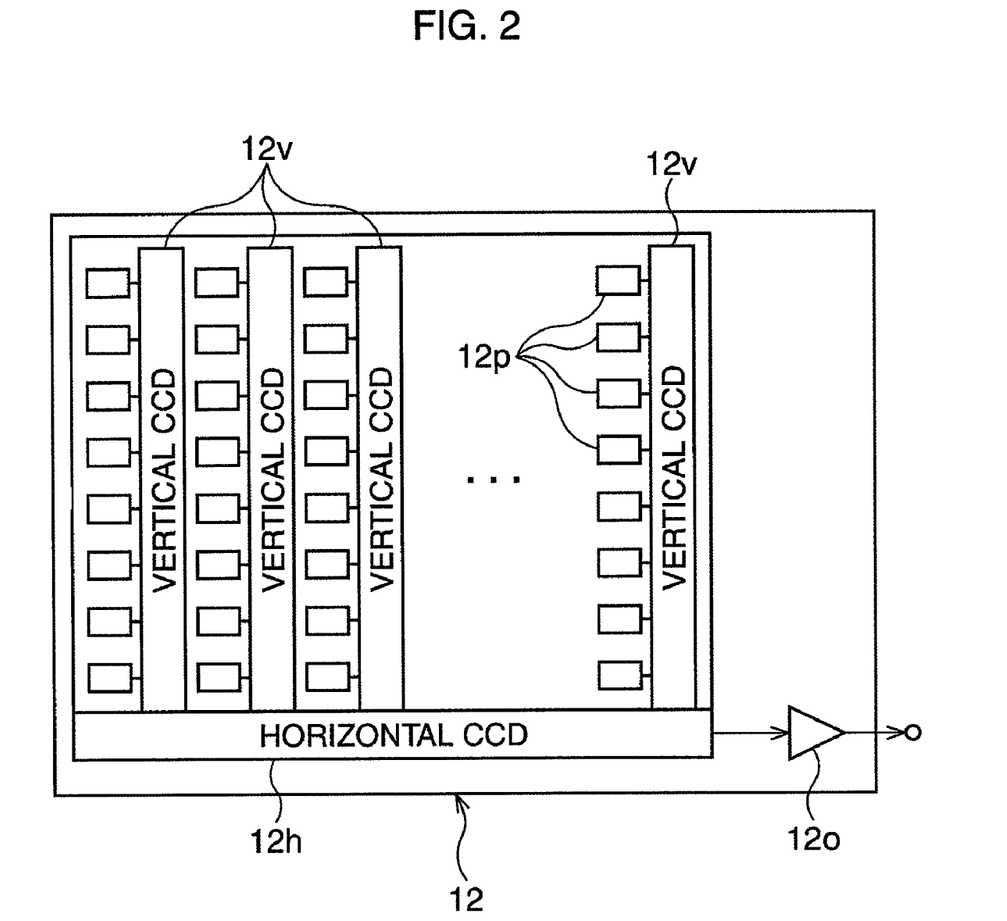
FIG. 2 is a block diagram showing the structure of the light-receiving surface of the imaging device.

The photographic optical system 11 is optically connected to the imaging device 12. An optical image of an object through the photographic optical system 11 is incident to the light-receiving surface of the imaging device 12. The imaging device 12 is, for example, a CCD area sensor. As shown in FIG. 2, a plurality of pixels 12*p* are arranged in a matrix on the light-receiving surface of the imaging device 12. When the light-receiving surface receives an optical image of an object, each pixel 12*p* generates a signal charge according to the light intensity incident to each pixel.

A plurality of vertical CCDs are mounted on the imaging device 12 along each column formed by the vertically arranged pixels. A singular horizontal CCD is mounted on the imaging device 12 at the bottom of the vertical CCDs. The signal charge generated by each pixel 12*p* is transferred to the horizontal CCD 12*h* from the vertical CCD 12*v*. The signal charge transferred to the horizontal CCD 12*h* is next transferred to the output block 12*o* by the horizontal CCD 12*h*. The output block 12*o* then converts the transferred signal charge into a pixel signal, which is a potential signal. The aggregate pixel signals generated during one frame period is output from the imaging device 12 as an image signal corresponding to an optical image of an object.

In general, an individual signal charge generated by a singular pixel 12*p* is transferred to the output block 12*o* through the vertical CCD 12*v* and the horizontal CCD 12*h*, as described above. In addition, the signal charge generated by the singular pixel 12*p* is mixed with other signal charges generated by other pixels 12*p* by the vertical or horizontal CCD 12*v*, 12*h*. In this manner, the CCD is able to capture an optical image by pixel mixing process, which is an operation of mixing a plurality of signal charges, even if the object is dark. Incidentally, the AFE 13 switches on or off the pixel mixing process function, as described later.

The photographic optical system 11 comprises plural lenses, including a zoom lens 11a and a focus lens 11b (see FIG. 1). The zoom lens 11a and the focus lens 11b are movable along an optical axis of the photographic optical system 11. The zoom lens 11a and the focus lens 11b form a zoom optical system. The focal length of the photographic optical system 11 is adjusted by moving the zoom lens 11a and the focus lens 11b in relationship to each other. Further, an optical image of an object can be focused on the light-receiving surface of the imaging device 12 by moving the focus lens 11b.

The zoom lens 11a and the focus lens 11b can be manually moved along the optical axis by a user. In addition, the zoom lens 11a and the focus lens 11b can also be moved by the zooming-driver 15. Further, the focus lens 11b can also be moved by the focusing driver 16 so that the object is brought into focus.

A diaphragm 18 and a shutter 19 are mounted between the photographic optical system 11 and the imaging device 12. The intensity of light made incident on the light-receiving surface of the imaging device 12 is adjusted by adjusting the aperture ratio of the diaphragm 18. An optical image reaches the light-receiving surface by opening the shutter 19, and an optical image is shielded from the light-receiving surface by closing the shutter 19. A diaphragm-driver 20 drives the diaphragm 18 so that the aperture ratio can be adjusted. A shutter-driver 21 drives the shutter 19 so that the shutter can be opened and closed.

Incidentally, the zooming-driver 16, the focusing-driver 17, the diaphragm-driver 20, and the shutter-driver 21 are all connected to the DSP 14. The DSP 14 controls the operations of the zooming-driver 16, the focusing-driver 17, the diaphragm-driver 20, and the shutter-driver 21.

The imaging device 12 is electrically connected to the DSP 14 via the AFE 13. A clock signal is sent from the DSP 14 to the AFE 13. The AFE 13 generates a frame signal and an imaging device driving signal based on the received clock signal. The imaging device driving signal is sent to the imaging device 12. The imaging device 12 is driven based on the imaging device driving signal to generate an image signal that is synchronized with the frame signal.

Incidentally, an image signal is sequentially generated in synchronicity with the frame signal, not only during photographing, but also while waiting for photographing. Based on the image signal generated while waiting for photographing, the photometry measurement, the image analysis for auto focus, and various other operations are carried out.

Figure 3:
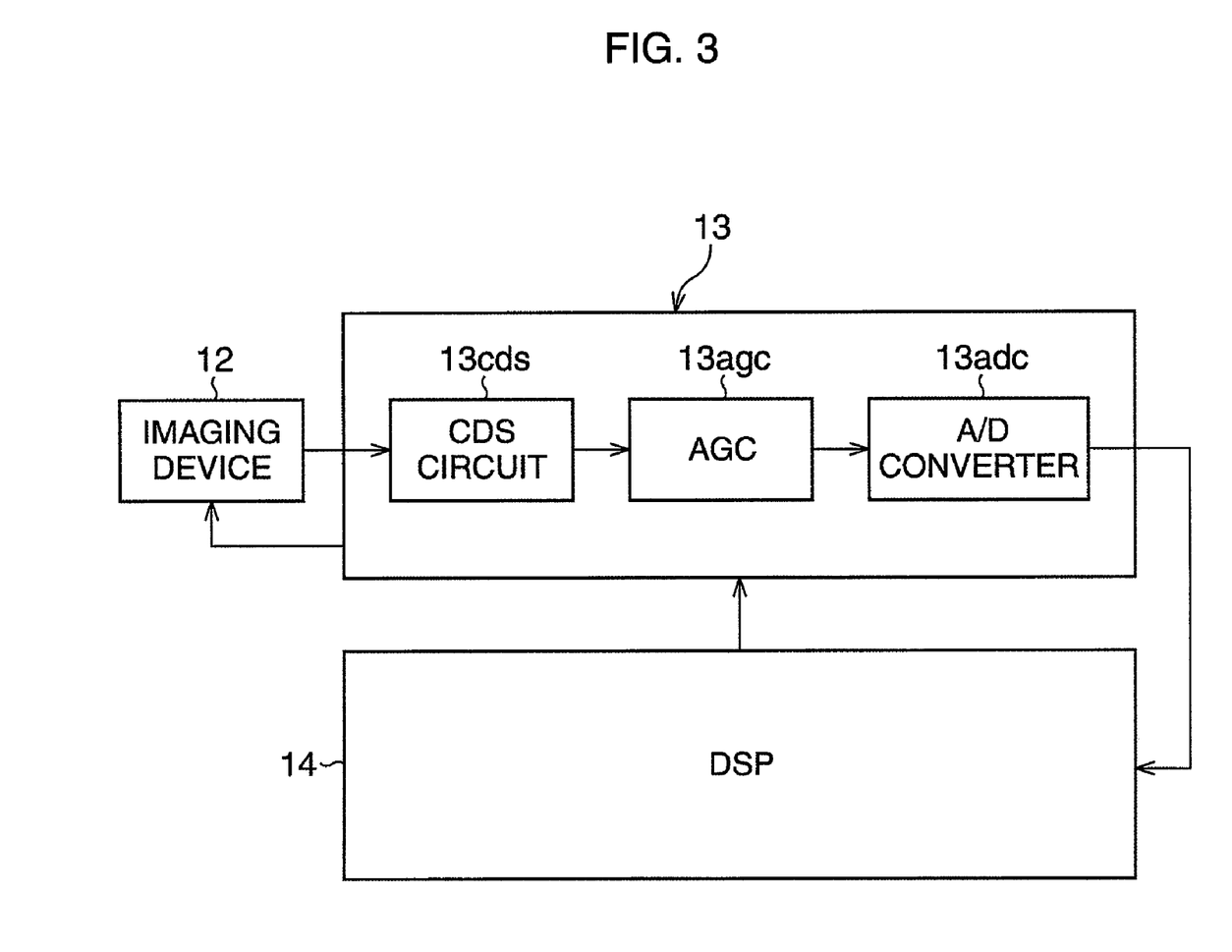
FIG. 3 is a block diagram showing the internal structure of the AFE.

The generated image signal is sent to the AFE 13. As shown in FIG. 3, the AFE 13 comprises a correlated double sampling (CDS) circuit 13cds, an auto gain controller (AGC) 13agc, and an A/D converter 13adc.

The image signal received by the AFE 13 is input to the CDS circuit 13cds and undergoes correlated double sampling. Subsequently, the image signal is amplified by the AGC 13agc. Incidentally, the amplification ratio for the image signal is determined by the DSP 14. Lastly, the image signal undergoes A/D conversion by the A/D converter 13adc, then the image signal is converted into image data and sent to the DSP 14.

The DSP 14 is connected to a dynamic random access memory (DRAM) 22 (see FIG. 1). The DRAM is used as a work memory for signal processing carried out by the DSP 14. The image data received by the DSP 14 is temporarily stored in the DRAM 22. The DSP 14 carries out predetermined signal processing for the image data stored in the DRAM 22.

The DSP 14 is connected to a monitor 23. The image data, having undergone predetermined signal processing, is sent to the monitor 23, which is able to display an image corresponding to the received image data.

The DSP 14 is connected to a card-interface 24 which can be connected to a memory card (not depicted). When a release operation, as described later, is carried out, the image data, having undergone predetermined signal processing, is stored in the memory card.

The DSP 14 is connected to the input block 15, where a user inputs operational commands. The input block 15 comprises a release button (not depicted), a multi-functional cross-key (not depicted), a power button (not depicted), and other buttons. The DSP 14 orders each component of the digital camera 10 to carry out a necessary operation according to a user's command input to the input block 15.

For example, by fully depressing the release button, a second switch (not depicted) is switched on. Then, the shutter 19 is driven so as to open and close, and the imaging device 12 is driven so as to capture a static optical image.

Further, by depressing the release button halfway, a first switch (not depicted) is switched on and exposure adjustment and focus adjustment are then carried out.

In the exposure adjustment, an exposure value is determined based on the image data, and adjustments of the aperture ratio of the diaphragm 18 and the shutter speed are thus carried out based on the determined exposure value.

In the focus adjustment, the position of the focus lens 11b is adjusted so that an optical image captured in a scanning area, which is a specific partial area of the total light-receiving surface area, can be focused on the light-receiving surface. In general, the scanning area is designated to be at the center of the light-receiving surface of the imaging device 12. Incidentally, the scanning area is not fixed and can be change by a user's command input to the multi-functional cross-key.

Figure 4:
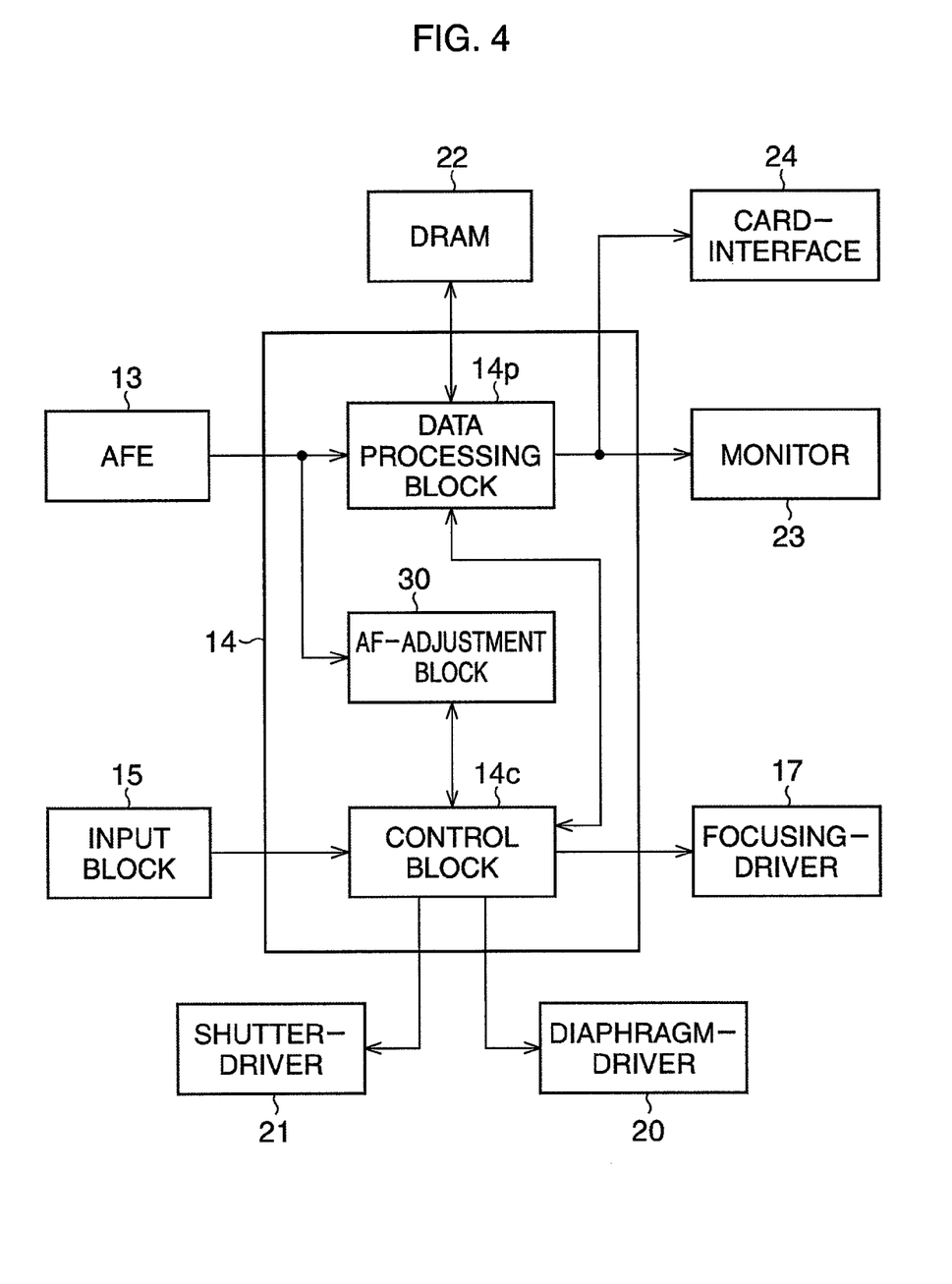
FIG. 4 is a block diagram showing the internal structure of the DSP.

Next, the internal structure of the DSP 14 is explained below, using FIG. 4. The DSP 14 comprises a data processing block 14p, an AF-adjustment block 30, and a control block 14c.

The image data is sent from the AFE 13 to the data process block 14p, which stores the received image data in the DRAM 22. In addition, the data process block 14p carries out predetermined data processing on the stored image data. Further, the data process block 14p sends the image data, having undergone predetermined data processing, to the monitor 23 or the memory card via the card-interface 24.

An input signal, according to an operational command input to the input block 15, is sent from the input block 15 to the control block 14c, which controls the data process block 14p, the AF-adjustment block 30, and each component of the digital camera 10 according to the received input signal.

For example, the control block 14c outputs the clock signal to the AFE 13. Further, the control block 14c orders the AFE 13 to generate the imaging device driving signal for terminating the pixel mixing process or for carrying out the pixel mixing process and designating the number of pixel signals to mix together.

Further, in the exposure adjustment, the control block 14c controls both the diaphragm driver 20 to drive the diaphragm 18 and the shutter driver 21 to open and close the shutter 19.

Further, the control block 14c controls the focusing driver 17 to re-position the focus lens 11b in the focus adjustment. In the focus adjustment, the control block 14c receives lens position data corresponding to the position of the focus lens determined by the AF-adjustment block 30. The control block 14c controls the focusing driver 17 based on the received lens position data, as described later.

Incidentally, the control block 14c orders the data processing block 14p to detect an average luminance of an entire optical image captured in the scanning area in the focus adjustment. The control block 14c then reads the detected average luminance of the entire optical image captured in the scanning area.

In the focus adjustment, signal charges are generated by the pixels 12p mounted in the scanning area. The pixel signals, which are generated by mixing a plurality of the signal charges according to the pixel mixing process, are used in the image analysis for auto focus. The control block 14c determines the number of pixel signals to mix with each other. The number of pixel signals to mix with each other is determined to be n1 when the average luminance of an entire optical image captured in the scanning area is less than a first threshold value. The number of pixel signals to mix with each other is determined to be n2 when the average luminance of an entire optical image captured in the scanning area is in the range between the first threshold value and a second threshold value, which is greater than the first threshold value. The number of pixel signals to mix with each other is determined to be n3 when the average luminance of an entire optical image captured in the scanning area is greater than the second threshold level. Incidentally, n1, n2, and n3 are whole numbers satisfying the relationship $n1 >= n2 >= n3 >= 1$. The control block 14c orders the AFE 13 to generate the imaging device driving signal designating the number of pixel signals to mix with each other.

Further, the control block 14c determines the amplification ratio used by the AGC 13agc in the focus adjustment. The amplification ratio is determined to be a value that is inversely proportional to the number of pixel signals that are mixed together. Consequently, when the number of pixel signals to mix together is n1, n2, and n3, the amplification number is determined to be 1/n1, 1/n2, and 1/n3, respectively. The control block 14c controls AFE 13 to amplify the image signal by the determined amplification ratio.

The image data is sent from the AFE 13 to the AF-adjustment block 30, which determines the position of the focus lens 11b based on the received image data so that the required object is in focus on the light-receiving surface. The structure and operation of the AF-adjustment block 30 are explained in detail below using FIG. 5.

Figure 5:
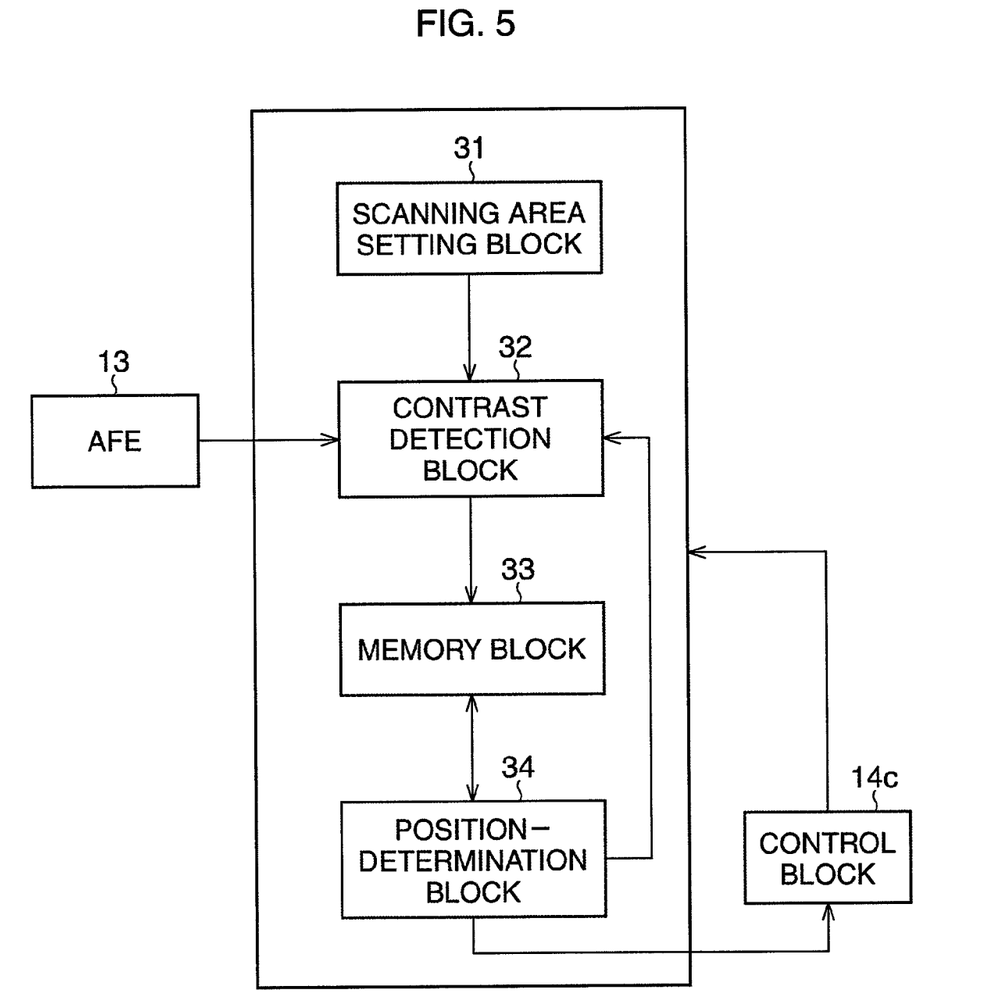
FIG. 5 is a block diagram showing the internal structure of the AF adjustment block.

The AF-adjustment block 30 comprises a scanning area setting block 31, a contrast detection block 32, a memory block 33, and a position-determination block 34. Incidentally, each one of these components is controlled by the control block 14c.

The scanning area setting block 31 designates a location of the scanning area within the entire light-receiving surface area of the imaging device 12. The input signal for determination of the location of the scanning area is sent to the scanning area setting block 31 via the control block 14c. Data corresponding to the designated scanning area is sent to the contrast detection block 32.

The contrast detection block 32 receives the image data from the AFE 13 and detects a contrast value of the optical image captured in the scanning area of the imaging device 12, based on the received image data. Incidentally, the contrast detection block 32 begins detecting a contrast value when the detection block 32 receives the first image data, soon after the first switch is switched on.

The detected contrast value and the corresponding position of the focus lens 11b are recorded in the memory block 33. Incidentally, the position of the focus lens 11b is detected by the focusing driver 17, and data corresponding to the detected position of the focus lens 11b is sent to the memory block 33 via the control block 14c.

The focus lens 11b is adjusted twice during successive captures of an optical image. After re-positioning the focus lens 11b, a contrast value of the scanning area is again detected by the contrast detection block 32 and recorded in the memory block 33. Afterwards in a similar manner, the adjustment of the focus lens 11b, the detection of the contrast value, and the record of the detected contrast value in the memory block 33 are repeated.

A plurality of recorded contrast values are read by the position determination block 34. The position determination block 34 determines the maximum value among the read contrast values. The determination block 36 also designates the position of the focus lens 11b corresponding to the determined maximum contrast value as the in-focus position of the focus lens 11b. The lens position data corresponding to the determined in-focus position of the focus lens 11b is then sent to the control block 14c.

Incidentally, the determination block 34 orders the contrast detection block 32 to continue detecting a contrast value until the maximum contrast value is detected. The detection of a contrast value and the adjustment of the focus lens are described in detail below.

The contrast value is detected and recorded in the memory block 33 when the first frame of the optical image is captured. Next, the focus lens 11b is re-positioned, through the minimum shift quantity per which the focus lens 11b can be adjusted, along the optical axis in the direction towards the near end. After the adjustment, the contrast value of the new position is detected. Following two separate iterations of re-positioning the focus lens 11b, detecting the contrast value, and recording the value in the memory block 33, the two contrast values are compared to one another.

When the contrast value detected after re-positioning is greater than the contrast value stored in the memory block 33, the re-positioning of the focus lens 11b in the direction towards the near end through the minimum shift quantity, the detection of the contrast value, and the recording of the newly detected contrast value are repeated. However, when the contrast value decreases during the repetition of the re-positioning, detection, and recording process, the position determination block 34 then determines that the previous position back towards the far end, through the minimum shift quantity, is the position of the focus lens 11b that maximizes the contrast value. Data corresponding to this position is sent to the control block 14c as data of the in-focus position of the focus lens 11b.

On the other hand, when the contrast value detected after the initial re-positioning of the focus lens 11b in the direction towards the near end is less than the contrast value recorded in the memory block 33, the focus lens 11b is re-positioned in the direction towards the far end through the minimum shift quantity and the contrast value is detected. Since then and similar to the previously described iterative process in the direction towards the near end, the movement of the focus lens 11b in the direction towards the far end, the detection of the contrast value, and the recording of the newly detected contrast value are repeated. When the contrast value decreases during the repetition of the re-positioning, detection, and recording process, the position determination block 34 then determines that the previous position back towards the near end through the minimum shift quantity is the position of the focus lens 11b that maximizes the contrast value. Data corresponding to this position is sent to the control block 14c as data of the in-focus position of the focus lens 11b.

Figure 6:
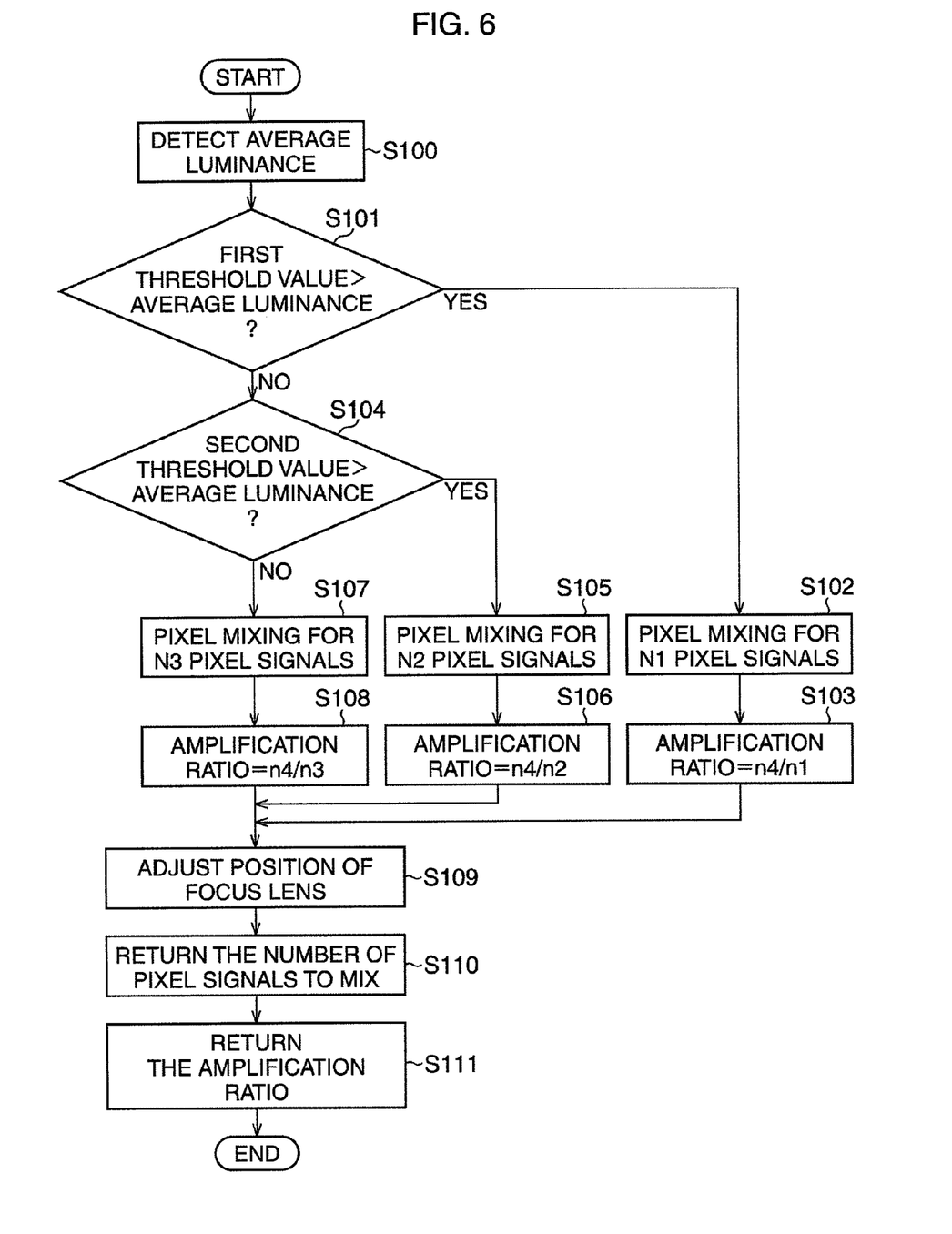
FIG. 6 is a flowchart explaining the process for the focus adjustment carried out by the DSP.

Next, the process for the focus adjustment carried out by the DSP 14 is explained using the flowchart of FIG. 6. The process for the focus adjustment starts when the first switch is switched on by depressing the release button halfway.

At step S100, the average luminance of an entire optical image captured in the scanning area is detected based on the image data. Subsequently at step S101, the detected average luminance is compared to the first threshold value.

When the average luminance is less than the first threshold value, the process proceeds to step S102. At step S102, the AFE 13 is controlled to generate and output the imaging device driving signal ordering the imaging device 12 to carry out the pixel mixing process for n1 pixels 12*p*. After step S102, the process proceeds to step S103. At step S103, the amplification ratio for the AFE 13 is designated to be n4/n1. Incidentally, n4 is a predetermined constant.

When the average luminance is greater than the first threshold value in the comparison at step S101, the process proceeds to step S104, where the average luminance detected at step S100 is further compared to the second threshold value.

When the average luminance is less then the second threshold value, the process proceeds to step S105. At step S105, the AFE 13 is controlled to generate and output the imaging device driving signal ordering the imaging device 12 to carry out the pixel mixing process for n2 pixels 12*p*. After step S105, the process proceeds to step S106, where the amplification ratio for the AFE 13 is designated to be n4/n2.

When the average luminance is greater than the second threshold value in the comparison at step S104, the process proceeds to step S107. At step S107, the AFE 13 is controlled to generate and output the imaging device driving signal ordering the imaging device 12 to carry out the pixel mixing process for n3 pixels 12*p*. After step S107, the process proceeds to step S108, where the amplification ratio for the AFE 13 is designated to be n4/n3.

After step S103, step S106, and step S108, the process proceeds to step S109, where the position of the focus lens 11*b* is adjusted so that the optical image captured in the designated scanning-area is focused on the light-receiving surface.

When the focus adjustment is complete, the process proceeds to step S110. At step S110, the AFE 13 is controlled to generate the imaging device driving signal ordering that pixel signals mixed together during the pixel mixing process be returned to the originally designated number prior to carrying out the focusing adjustment. At step S111 subsequent to step S110, the amplification ratio is returned to the previously designated amplification ratio prior to carrying out the focus adjustment. After resetting the amplification ratio, the process for focus adjustment is complete.

In the above embodiment, the capability exists for carrying out an accurate focus adjustment with respect to the optical image of an object regardless of whether the object being brought into focus is dark or bright.

For an accurate focus adjustment, it is necessary to use the pixel signals of which the S/N ratio is high and a small percentage of the total amount of pixel signals used for detecting the contrast value is saturated. In the above embodiment, the S/N ratio of the pixel signals is high and a small amount of all used pixel signals is saturated whether the optical image is dark or bright. Accordingly, the capability exists for carrying out the focus adjustment for an object of any brightness.

The imaging device driver of the present invention is adapted to an auto focus unit in the above embodiment. However, the imaging device driver can be adapted to another unit to carry out another function. If the signal intensity of an image signal output from the imaging device 12 is required to be maintained at an adequate intensity level in order to accurately carry out a predetermined function, the accuracy of the predetermined function is improved by adapting the imaging device driver of the above embodiment. This concept is described further in detail below.

When an optical image of an object is dark, the corresponding S/N ratio is low because of the low signal level of the generated image signal. Despite being able to brighten an image displayed on a monitor by increasing the amplification ratio, the S/N ratio itself remains low because a noise component is also amplified by the increased amplification ratio. On the other hand, the S/N ratio is improved by pixel mixing process by the imaging device because signal charges are mixed before a noise component is mingled in. However, when an optical image of an object is bright, mixed signal charges may become saturated by pixel mixing process at the vertical or horizontal CCD 12*v*, 12*h*. In such a case, an accurate image signal corresponding to an image cannot be captured. However, the imaging device driver in the above embodiment can order the imaging device to generate an image signal of adequate intensity, corresponding to an accurate image because the number of pixel signals that are mixed together is adjusted according to the brightness of the captured image.

An image signal is amplified by an amplification ratio that is inversely proportional to the number of pixel signals mixed together, in the above embodiment. However, the amplification ratio may not always be inversely proportional to the number of pixel signals that are mixed together. If the amplification ratio is decreased according to the number of pixel signals that are mixed together, an effect similar to that of the above embodiment can be achieved. In addition, the amplification ratio may also be a constant, in which case the focus adjustment can be carried out accurately.

The number of pixel signals to mix together in the above embodiment is determined based on a comparison between the average luminance of an entire optical image captured in the scanning area, and the first and second threshold value. However, the number of threshold values used for comparison purposes with the average luminance is not restricted to two. The average luminance can be compared to additional threshold values, and the number of pixel signals to mix together can still be determined. In addition, if the number of pixel signals to mix together is decreased according to the average luminance, an effect similar to that of the above embodiment can be achieved.

The focus lens 11*b* is re-positioned towards the near end when focus adjustment is carried out in the above embodiment. However, the focus lens 11*b* may be re-positioned towards the far end.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-069016 (filed on Mar. 14, 2006), which is expressly incorporated herein, by reference, in its entirety.

The invention claimed is:

1. An auto focus unit that brings an optical image of an object into focus on an imaging device, said imaging device having a light-receiving surface, a plurality of pixels being arranged on said light-receiving surface, each individual said pixel generating a pixel signal according to the intensity of light received by said pixel, said imaging device being capable of mixing a plurality of said pixel signals, said auto focus unit comprising:

a controller that varies the number of said pixel signals to be mixed by said imaging device according to the brightness of a partial or entire optical image of said object captured by said imaging device;

a receiver that receives a mixed signal, which is generated by mixing the number of said pixel signals determined by said controller; and a lens driver that moves a focus lens so that said optical image is brought into focus on said light-receiving surface, in accordance with the mixed signal.

2. The auto focus unit according to claim 1, further comprising a detector that detects the average brightness of the partial or entire optical image, the controller varying the number of pixel signals to be mixed in accordance with the average brightness detected by said detector.

3. The auto focus unit according to claim 1, wherein the controller varies the number of pixel signals to be mixed by said imaging device by selecting a number of pixels to be mixed based on a comparison of an average brightness of at least a part of the optical image with a plurality of threshold values.

4. The auto focus unit according to claim 1, wherein the controller outputs a signal that selectively switches the pixel mixing ON and OFF.

5. The auto focus unit according to claim 1, the controller determining an amplification ratio based upon the number of pixels mixed by the imaging device.

6. The auto focus unit according to claim 5, the controller determining the amplification ratio to be inversely proportional to the number of pixel signals mixed by the imaging device.

7. The auto focus unit according to claim 1, wherein the controller drives the lens driver in accordance with the number of pixel signals mixed by the imaging device.

8. An auto focus unit that brings an optical image of an object into focus, the auto focus unit comprising:

an imaging device having a light receiving surface, a plurality of pixels being arranged on the light receiving surface of the imaging device, each individual one of said plurality of pixels generating a pixel signal in accordance with an intensity of light received by each said pixel, said imaging device being configured to mix a plurality of said pixel signals;

a detector that detects a brightness of a partial or an entire optical image of an object captured by said imaging device;

a controller that varies the number of said pixel signals to be mixed by said imaging device in accordance with the brightness of the partial or the entire optical image detected by said detector; and a lens driver that moves a focus lens so that the optical image is brought into focus on said light receiving surface of said imaging device in accordance with the number of pixel signals mixed by said controller.

9. The auto focus unit according to claim 8, wherein the controller varies the number of pixel signals to be mixed by said imaging device by selecting a number of pixels to be mixed based on a comparison of an average brightness of at least a part of the optical image with a plurality of threshold values.

10. The auto focus unit according to claim 8, the controller determining an amplification ratio based upon the number of pixels mixed by the imaging device.

11. The auto focus unit according to claim 10, the controller determining the amplification ratio to be inversely proportional to the number of pixel signals mixed by said imaging device.

* * * * *